(12) United States Patent
Hong et al.

(10) Patent No.: US 12,007,273 B2
(45) Date of Patent: Jun. 11, 2024

(54) METHOD OF STABILIZING DATA OF DIGITAL SIGNALS

(71) Applicant: ANPEC ELECTRONICS CORPORATION, Hsinchu (TW)

(72) Inventors: Jia-Hua Hong, Hsinchu (TW); Chih-Heng Su, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 396 days.

(21) Appl. No.: 17/392,263

(22) Filed: Aug. 3, 2021

(65) Prior Publication Data
US 2022/0333983 A1    Oct. 20, 2022

(30) Foreign Application Priority Data
Apr. 20, 2021   (TW) .................................. 110114041

(51) Int. Cl.
*G01J 1/44*    (2006.01)
*G01J 1/42*    (2006.01)

(52) U.S. Cl.
CPC ................ *G01J 1/44* (2013.01); *G01J 1/4204* (2013.01); *G01J 2001/444* (2013.01)

(58) Field of Classification Search
CPC ...... G01J 1/44; G01J 1/4204; G01J 2001/444; G01J 1/0295
See application file for complete search history.

(56) References Cited

U.S. PATENT DOCUMENTS

| 2011/0156800 A1 | 6/2011 | Lee et al. | |
| 2018/0248545 A1* | 8/2018 | Bar | H03K 17/945 |
| 2019/0013876 A1* | 1/2019 | Horikoshi | H04B 10/2513 |

FOREIGN PATENT DOCUMENTS

TW          201014175 A1    4/2010

* cited by examiner

*Primary Examiner* — Thanh Luu
*Assistant Examiner* — Monica T Taba
(74) *Attorney, Agent, or Firm* — Li & Cai Intellectual Property Office

(57) ABSTRACT

A method of stabilizing data of digital signals is provided. The method includes steps of: setting a boundary coefficient; reading a piece of digital data; defining a value of the piece of digital data as a center value; outputting the value of the piece of digital data; reading a next piece of digital data; subtracting a value of the next piece of digital data from the previously outputted value to obtain a positive difference or a negative difference; and determining whether or not an absolute value of the positive or negative difference is larger than the boundary coefficient, if not, outputting the center value, if yes, updating the center value such that the updated center value is equal to the value of the next piece of digital data, and outputting the updated center value.

4 Claims, 13 Drawing Sheets

| Time Point | T1 | T2 | T3 | T4 | T5 | T6 | T7 | T8 | T9 | T10 | How Many Kinds Of Values |
|---|---|---|---|---|---|---|---|---|---|---|---|
| Read Value | 0 | +1 | +2 | +1 | -3 | -2 | -1 | 0 | -2 | -1 | 5 |
| Output Value | 0 | 0 | 0 | 0 | -3 | -3 | -3 | 0 | 0 | 0 | 3 |

| Time Point | T1 | T2 | T3 | T4 | T5 | T6 | T7 | T8 | T9 | T10 | How Many Kinds Of Values |
|---|---|---|---|---|---|---|---|---|---|---|---|
| Read Value | 0 | +1 | +2 | +1 | -3 | -2 | -1 | 0 | -2 | -1 | 5 |
| Output Value | 0 | 0 | 0 | 0 | -1 | -1 | -1 | -1 | -1 | -1 | 1 |

METHOD OF STABILIZING DATA OF DIGITAL SIGNALS

CROSS-REFERENCE TO RELATED PATENT APPLICATION

This application claims the benefit of priority to Taiwan Patent Application No. 110114041, filed on Apr. 20, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to digital signals, and more particularly to a method of stabilizing data of digital signals.

BACKGROUND OF THE DISCLOSURE

A sensor such as an ambient light sensor (ALS) or a proximity sensor (PS) is used to sense a light intensity of a light signal. When ambient light is weak, the light intensity of the light signal sensed by the sensor fluctuates slightly over time. When the fluctuation in the light intensity of the light signal is read by a user, the user may mistakenly believe that the fluctuation in the light intensity is caused by noise and question the noise-filtering capability of the sensor.

SUMMARY OF THE DISCLOSURE

In response to the above-referenced technical inadequacies, the present disclosure provides a method of stabilizing data of digital signals. The method of stabilizing data of digital signals includes the following steps: (a) setting a boundary coefficient; (b) reading a piece of digital data; (c) defining a value of the piece of digital data as a center value; (d) outputting the value of the piece of digital data; (e) reading a next piece of digital data; (f) subtracting the value of the piece of digital data from a value of the next piece of digital data to obtain a difference, wherein the difference is a positive value or a negative value; and (g) determining whether or not an absolute value of the difference is larger than the boundary coefficient, in response to determining that the absolute value of the difference is not larger than the boundary coefficient, outputting a value that is equal to the center value, then returning to step (e) to read a further next piece of digital data, in response to determining that the absolute value of the difference is larger than the boundary coefficient, updating the center value such that the center value is equal to the value of the next piece of digital data, outputting the value that is equal to the center value that has been updated, and then returning to step (e) to read the further next piece of digital data.

In certain embodiments, the method of stabilizing the data of the digital signals further includes the following steps: (h) setting a positive boundary coefficient included in the boundary coefficient; (i) setting a negative boundary coefficient included in the boundary coefficient; (j) subtracting the value of the piece of digital data from the value of the next piece of digital data to obtain the difference; and (k) determining whether or not the difference is larger than the positive boundary coefficient or smaller than the negative boundary coefficient, in response to determining that the difference is not larger than the positive boundary coefficient and not smaller than the negative boundary coefficient, outputting the value that is equal to the center value, then returning to step (e) to read the further next piece of digital data, in response to determining that the difference is larger than the positive boundary coefficient or smaller than the negative boundary coefficient, updating the center value such that the center value is equal to the value of the next piece of digital data, outputting the value that is equal to the center value, and then returning to step (e) to read the further next piece of digital data.

In certain embodiments, the method of stabilizing the data of the digital signals further includes the following step: (l) setting an absolute value of the positive boundary coefficient that is equal to an absolute value of the negative boundary coefficient.

In certain embodiments, the method of stabilizing the data of the digital signals further includes the following steps: (m) calculating an amount of change in the center value; and (n) dynamically adjusting the positive boundary coefficient and the negative boundary coefficient according to the amount of change in the center value.

In certain embodiments, the method of stabilizing the data of the digital signals further includes the following steps: (o) setting a positive boundary coefficient included in the boundary coefficient; (p) setting a negative boundary coefficient included in the boundary coefficient; (q) setting a correction coefficient; (r) subtracting the value of the piece of digital data from the value of the next piece of digital data to obtain the difference; (s) determining whether or not the difference is larger than the positive boundary coefficient, in response to determining that the difference is larger than the positive boundary coefficient, subtracting the correction coefficient from the value of the next piece of digital data to obtain a first center value, updating the center value such that the center value is equal to the first center value, then performing step (u), and in response to determining that the difference is not larger than the positive boundary coefficient, performing step (t); (t) determining whether or not the difference is smaller than the negative boundary coefficient, in response to determining that the difference is smaller than the negative boundary coefficient, adding up the value of the next piece of digital data and the correction coefficient to obtain a second center value, updating the center value such that the center value is equal to the second center value, then performing step (u), and in response to determining that the difference is not smaller than the negative boundary coefficient, performing step (u); and (u) outputting the value that is equal to the center value.

In certain embodiments, the method of stabilizing the data of the digital signals further includes the following steps: (v) calculating an amount of change in the center value; and (w) dynamically adjusting one or more of the correction coefficient, the positive boundary coefficient and the negative boundary coefficient according to the amount of change in the center value.

As described above, the present disclosure provides the method of stabilizing data of digital signals, which has the following advantages:

1. the boundary coefficient and the correction coefficient are set such that a signal-to-noise ratio (SNR) of the sensor reaches a target signal-to-noise ratio, thereby improving stability of the outputted signal;
2. the method is applicable to an environment in which the ambient light intensity and noise are low and capable of minimizing the fluctuation in the outputted signal;
3. when the difference between the value of the piece of digital data and the value of the next piece of digital data is larger than the boundary coefficient, the appropriate operations are immediately executed without requiring additional calculation time;
4. each of the pieces of digital data is only compared with the previous piece of digital data, and these digital data do not occupy too much space in a register;
5. a digital filter, an averaging circuit or other digital signal processors can be used; and
6. the method can be performed by the hardware and the software.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
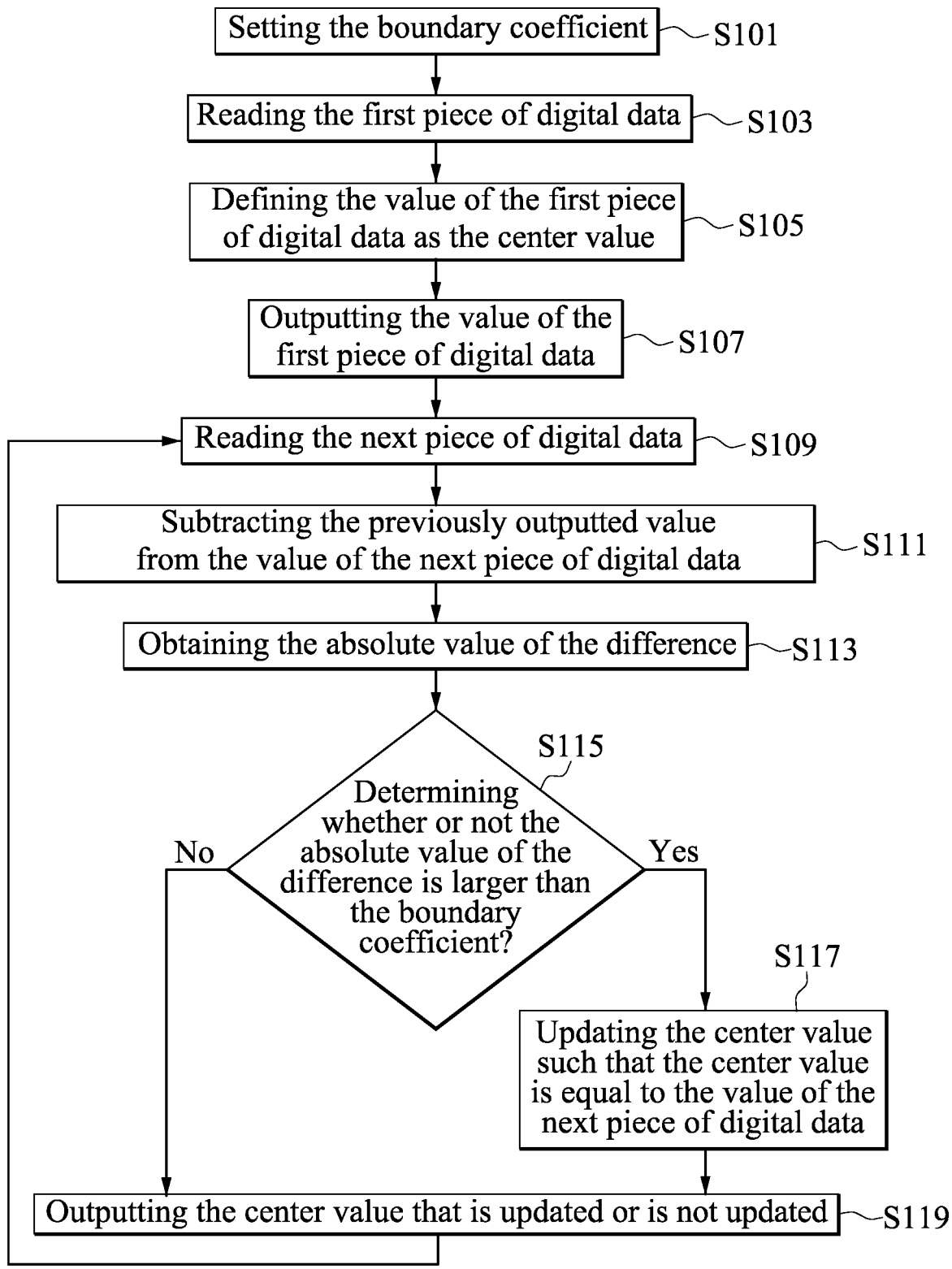
FIG. 1 is a flowchart diagram of a method of stabilizing data of digital signals according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figures 5, 6:
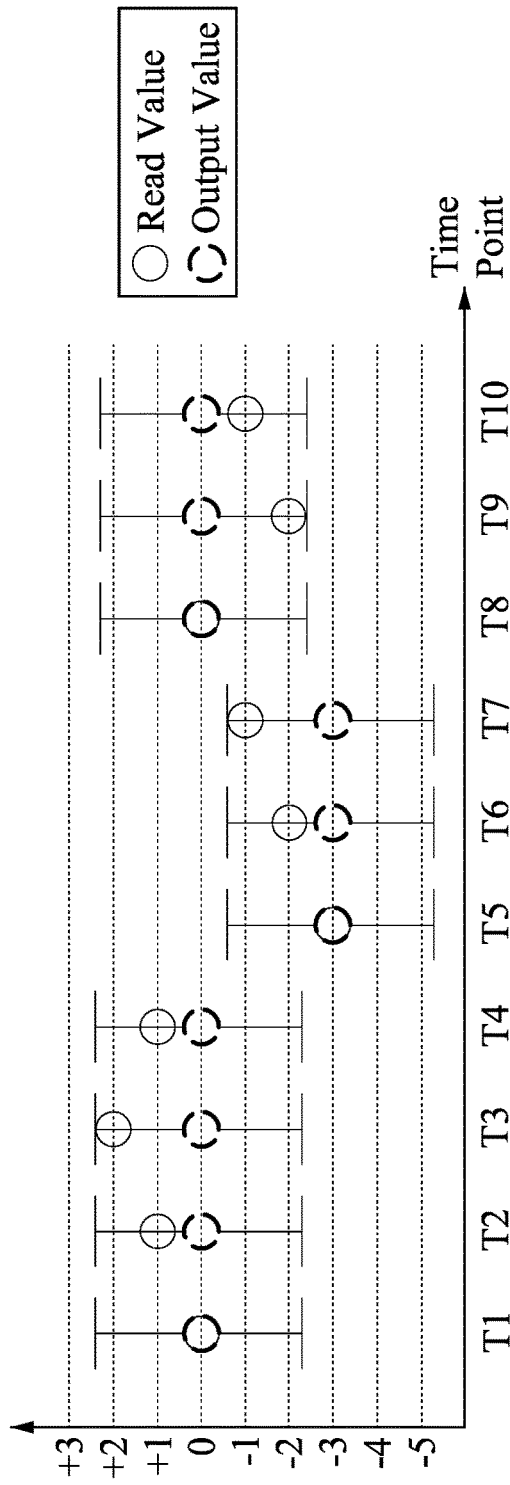
FIG. 5 is a schematic diagram of a boundary coefficient being set to "2" and a correction coefficient being set to "0" in the method of stabilizing the data of the digital signals according to the second embodiment of the present disclosure.
FIG. 6 is a schematic diagram of a center value being generated when the boundary coefficient is set to "2" (and the correction coefficient is set to "0" or is not set) in the method of stabilizing the data of the digital signals according to the first and second embodiments of the present disclosure.

Reference is made to FIGS. 1, 5 and 6, in which FIG. 1 is a flowchart diagram of a method of stabilizing data of digital signals according to a first embodiment of the present disclosure, FIG. 5 is a schematic diagram of a boundary coefficient being set to "2" and a correction coefficient being set to "0" in the method of stabilizing the data of the digital signals according to the second embodiment of the present disclosure, and FIG. 6 is a schematic diagram of a center value being generated when the boundary coefficient is set to "2" (and the correction coefficient is set to "0" or is not set) in the method of stabilizing the data of the digital signals according to the first and second embodiments of the present disclosure.

The method of stabilizing data of digital signals may include steps S101 to S119 shown in FIG. 1. The steps S101 to S119 may be applied to an example of FIGS. 5 and 6, but the present disclosure is not limited thereto. It should be understood that, an order and contents of the steps S101 to S119 may be adjusted according to actual requirements.

In step S101, the boundary coefficient is set. For example, the boundary coefficient is set to "2" in the example of FIGS. 5 and 6, but the present disclosure is not limited thereto.

In step S103, a piece of digital data is read. As shown in FIGS. 5 and 6, a value "0" of a first piece of digital data is read at a time point T1.

In step S105, the value of the piece of digital data is defined as the center value. For example, the center value is set to "0" according to the value "0" of the first piece of digital data.

In step S107, the value "0" of the first piece of digital data is outputted.

In step S109, a next piece of digital data is read. As shown in FIGS. 5 and 6, a value "+1" of a second piece of digital data is read at a time point T2.

In step S111, the value of the piece of digital data is subtracted from a value of the next piece of digital data to obtain a difference. The difference is a positive value or a negative value. For example, as shown in FIGS. 5 and 6, the value "0" of the first piece of digital data is subtracted from the value "+1" of the second piece of digital data to obtain a difference "+1", or the value of the value "+1" of the second piece of digital data is subtracted from the value "0" of the first piece of digital data to obtain a difference "−1".

In step S113, an absolute value of the difference is taken.

In step S115, it is determined whether or not the absolute value of the difference such as "1" is larger than the boundary coefficient. If the absolute value of the difference is not larger than the boundary coefficient, step S119 is then performed. In step S119, a value that is equal to the center value is outputted as an output value of the next piece of digital data (that is the second piece of digital data).

For example, as shown in FIGS. 5 and 6, an absolute value of a difference between the value "0" of the first piece of digital data read at the time point T1 and the value "+1" of the second piece of digital data read at the time point T2 is "1". The difference "1" is not larger than the boundary coefficient "2". Therefore, step S119 is then performed. In step S119, the value that is equal to the center value "0" is outputted as the output value of the next piece of digital data (that is the second piece of digital data).

Then, a value "+2" of a third piece of digital data is read at a time point T3. The third piece of digital data is a next piece of digital data of the second piece of digital data. An absolute value of a difference between the output value "0" of the second piece of digital data and the value "+2" of the third piece of digital data is "2". The absolute value "2" of the difference is not larger than the boundary coefficient "2". Therefore, step S119 is then performed. In step S119, the value that is equal to the center value "0" is outputted as an output value of the third piece of digital data read at the time point T3.

Then, a value "+1" of a fourth piece of digital data is read at a time point T4. The fourth piece of digital data is a next piece of digital data of the third piece of digital data. An absolute value of a difference between the output value "0" of the third piece of digital data and the value "+1" of the fourth piece of digital data is "1". The absolute value "1" of the difference is not larger than the boundary coefficient "2". Therefore, step S119 is then performed. In step S119, the value that is equal to the center value "0" is outputted as an output value of the fourth piece of digital data. After the fourth piece of digital data is read at the time point T4, the output value "0" is outputted.

Conversely, if it is determined that the absolute value of the difference is larger than the boundary coefficient in step S115, step S117 is then performed. In step S117, the center value is updated and the updated center value is equal to the value of the next piece of digital data that is currently read, and then step S119 is performed. In step S119, the value that is equal to the updated center value is outputted as the output value.

After step S119 is performed, step S109 is then performed again to read a further next piece of digital data. Then, steps S111 to S119, or steps S111 to S115 and S119, are performed on the further next piece of digital data.

For example, as shown in FIGS. 5 and 6, a value "−3" of a fifth piece of digital data is read at a time point T5. The fifth piece of digital data is a next piece of digital data of the fourth piece of digital data. An absolute value of a difference between the output value "0" of the fourth piece of digital data and the value "−3" of the fifth piece of digital data is "3". The absolute value "3" of the difference is larger than the boundary coefficient "2". Therefore, steps S117 and S119 are then sequentially performed. In step S117, the center value is updated and the updated center value is equal to the value "−3" of the fifth piece of digital data. A value that is equal to the updated center value "−3" is outputted as an output value of the fifth piece of digital data.

Then, a value "−2" of a sixth piece of digital data is read at a time point T6. The sixth piece of digital data is a next piece of digital data of the fifth piece of digital data. An absolute value of a difference between the output value "−3" of the fifth piece of digital data and the value "−2" of the sixth piece of digital data is "1". The absolute value "1" of the difference is not larger than the boundary coefficient "2". Therefore, step S119 is then performed. In step S119, a value that is equal to the center value "−3" is outputted as an output value of the sixth piece of digital data read at the time point T6.

Then, a value "−1" of a seventh piece of digital data is read at a time point T7. The seventh piece of digital data is a next piece of digital data of the sixth piece of digital data. An absolute value of a difference between the output value "−3" of the sixth piece of digital data and the value "−1" of the seventh piece of digital data is "2". The absolute value "2" of the difference is not larger than the boundary coefficient "2". Therefore, step S119 is then performed. In step S119, a value that is equal to the center value "−3" is outputted as an output value of the seventh piece of digital data.

A value "0" of an eighth piece of digital data is read at a time point T8. The eighth piece of digital data is a next piece of digital data of the seventh piece of digital data. An absolute value of a difference between the output value "−3" of the seventh piece of digital data and the value "0" of the eighth piece of digital data is "3". The absolute value "3" of the difference is larger than the boundary coefficient "2". Therefore, steps S117 and S119 are then sequentially performed. In step S117, the center value is updated and the updated center value is equal to the value "0" of the eighth piece of digital data. A value that is equal to the updated center value "0" is outputted as an output value of the eighth piece of digital data.

As shown in FIGS. 5 and 6, multiple pieces of digital data are read respectively at time points T1 to T10. If the values of the multiple pieces of digital data are directly and sequentially outputted as an output value, drastic fluctuation in the output value is read by a user. However, after steps S101 to S119 of the method of stabilizing the data of the digital signals are performed, the fluctuation in the output value read by the user is significantly reduced.

Figure 2:
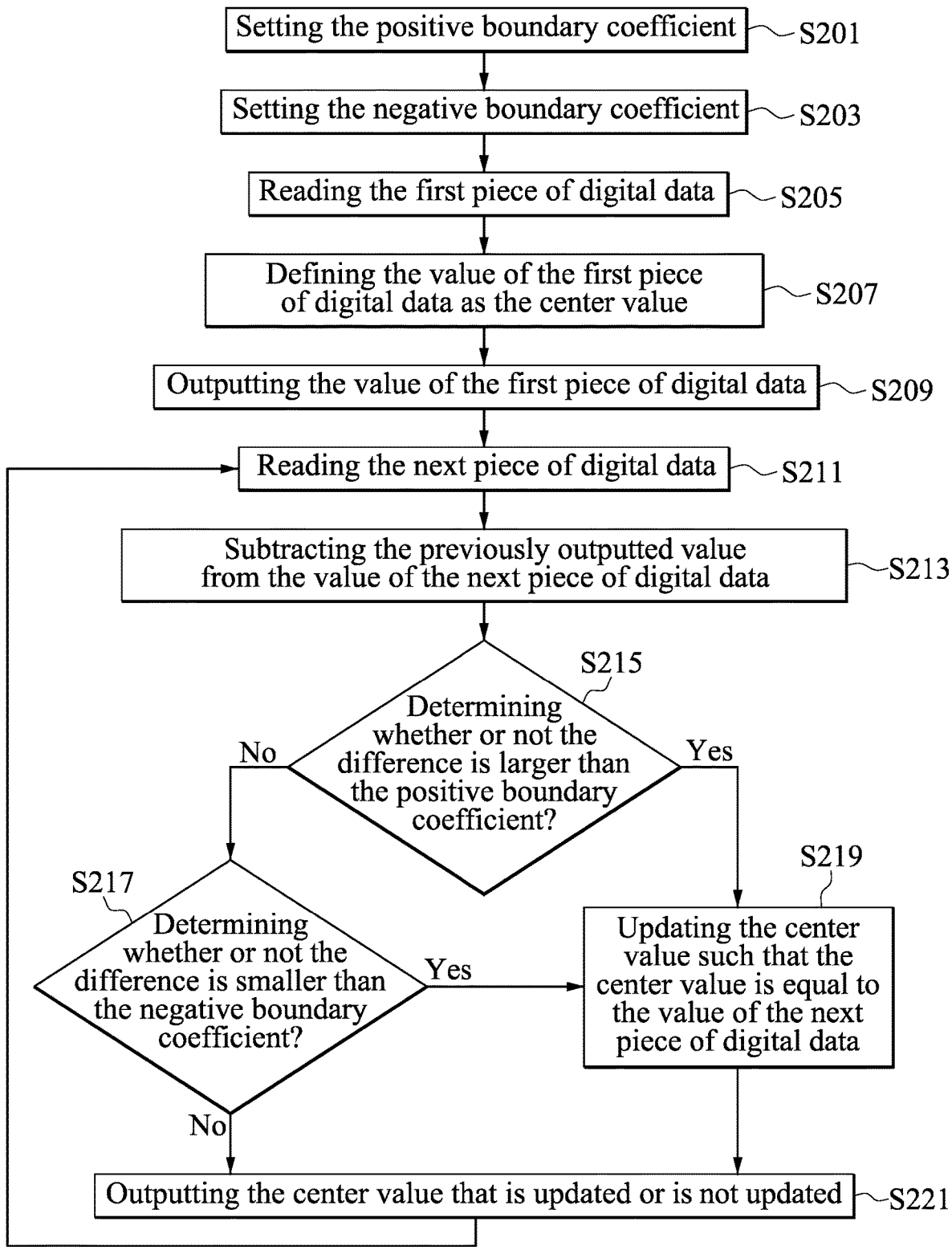
FIG. 2 is a flowchart diagram of a method of stabilizing data of digital signals according to a second embodiment of the present disclosure.

Reference is made to FIGS. 2, 5 and 6, in which FIG. 2 is a flowchart diagram of a method of stabilizing data of digital signals according to a second embodiment of the present disclosure, FIG. 5 is a schematic diagram of a boundary coefficient "2" and a correction coefficient "0" setting in the method of stabilizing the data of the digital signals according to the second embodiment of the present disclosure, and FIG. 6 is a schematic diagram of a center value being generated when only the boundary coefficient "2" is set or both the boundary coefficient "2" and the correction coefficient "0" are set in the method of stabilizing the data of the digital signals according to the first and second embodiments of the present disclosure.

The method of stabilizing the data of the digital signals may include steps S201 to S221 shown in FIG. 2. The steps S201 to S221 may be applicable to the example of FIGS. 5 and 6, but the present disclosure is not limited thereto.

In step S201, a positive boundary coefficient is set. For example, the positive boundary coefficient is set to "+2".

In step S203, a negative boundary coefficient is set. For example, the negative boundary coefficient is set to "−2". In the embodiment, an absolute value of the positive boundary coefficient is equal to an absolute value of the negative boundary coefficient, but the present disclosure is not limited thereto.

In step S205, the first piece of digital data is read.

In step S207, the value of the first piece of digital data is defined as the center value.

In step S209, the value of the first piece of digital data is outputted.

In step S211, the next piece of digital data is read.

In step S213, the output value of the previous piece of digital data is subtracted from the value of the next piece of digital data that is currently read to obtain the difference. The difference is a positive value or a negative value. If the difference is positive, the difference is called as a positive difference in the following. If the difference is negative, the difference is called as a negative difference in the following.

In step S215, it is determined whether or not the difference is larger than the positive boundary coefficient. If the difference is not larger than the positive boundary coefficient, step S217 is then performed. If the difference is larger than the positive boundary coefficient, steps S219 and S221 are then sequentially performed.

In step S217, it is determined whether or not the difference (that may be the positive difference or the negative difference) is smaller than the negative boundary coefficient. If the difference is not larger than the positive boundary coefficient and not smaller than the negative boundary coefficient, the value that is equal to the center value is outputted as the output value of the next piece of digital data.

Conversely, if the difference is larger than the positive boundary coefficient or smaller than the negative boundary coefficient, step S219 is then performed. In step S219, the center value is updated and the updated center value is equal to the value of the next piece of digital data. Then, step S221 is performed. In step S221, the value that is equal to the updated center value is outputted as the output value.

For example, the output value "−3" of the sixth piece of digital data is subtracted from the value "−1" of the seventh piece of digital data read at the time point T7 as shown in FIGS. 5 and 6 to obtain a positive difference "+2". The positive difference "+2" is not larger than the positive boundary coefficient "+2" and not smaller than the negative boundary coefficient "−2". Therefore, the output value of the seventh piece of digital data read at the time point T7 is equal to the center value "−3". The output value "−3" of the seventh piece of digital data is subtracted from the value "0" of the eighth piece of digital data read at the time point T8 to obtain a positive difference "+3". The positive difference "+3" is larger than the positive boundary coefficient "+2". Therefore, step S219 is then performed. In step S219, the center value is updated and the updated center value is equal to the value "0" of the eighth piece of digital data read at the time point T8. Then, step S221 is performed. In step S221, a value that is equal to the updated center value "0" is outputted as the output value.

Figure 3:
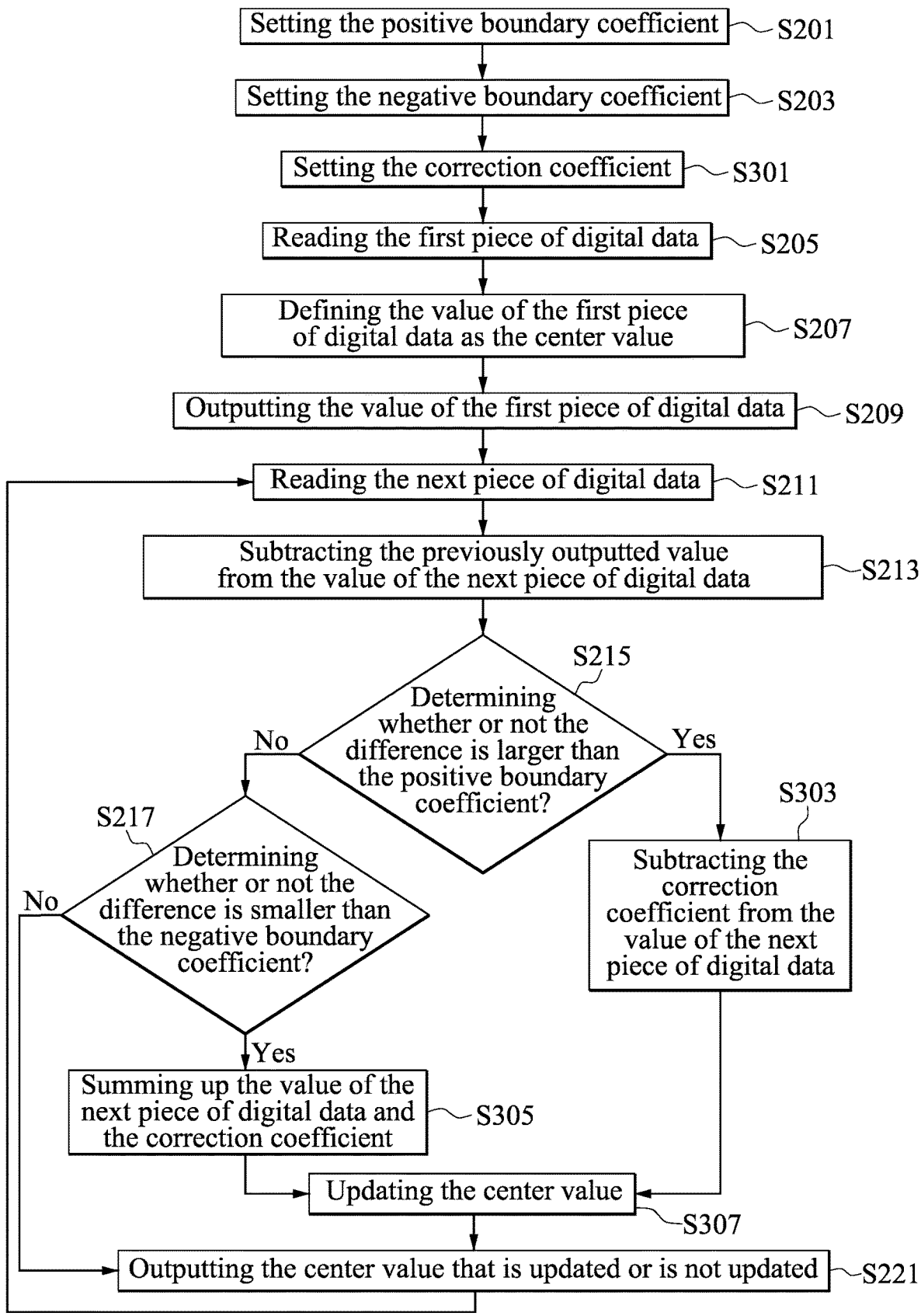
FIG. 3 is a flowchart diagram of a method of stabilizing data of digital signals according to a third embodiment of the present disclosure.
Figure 7:
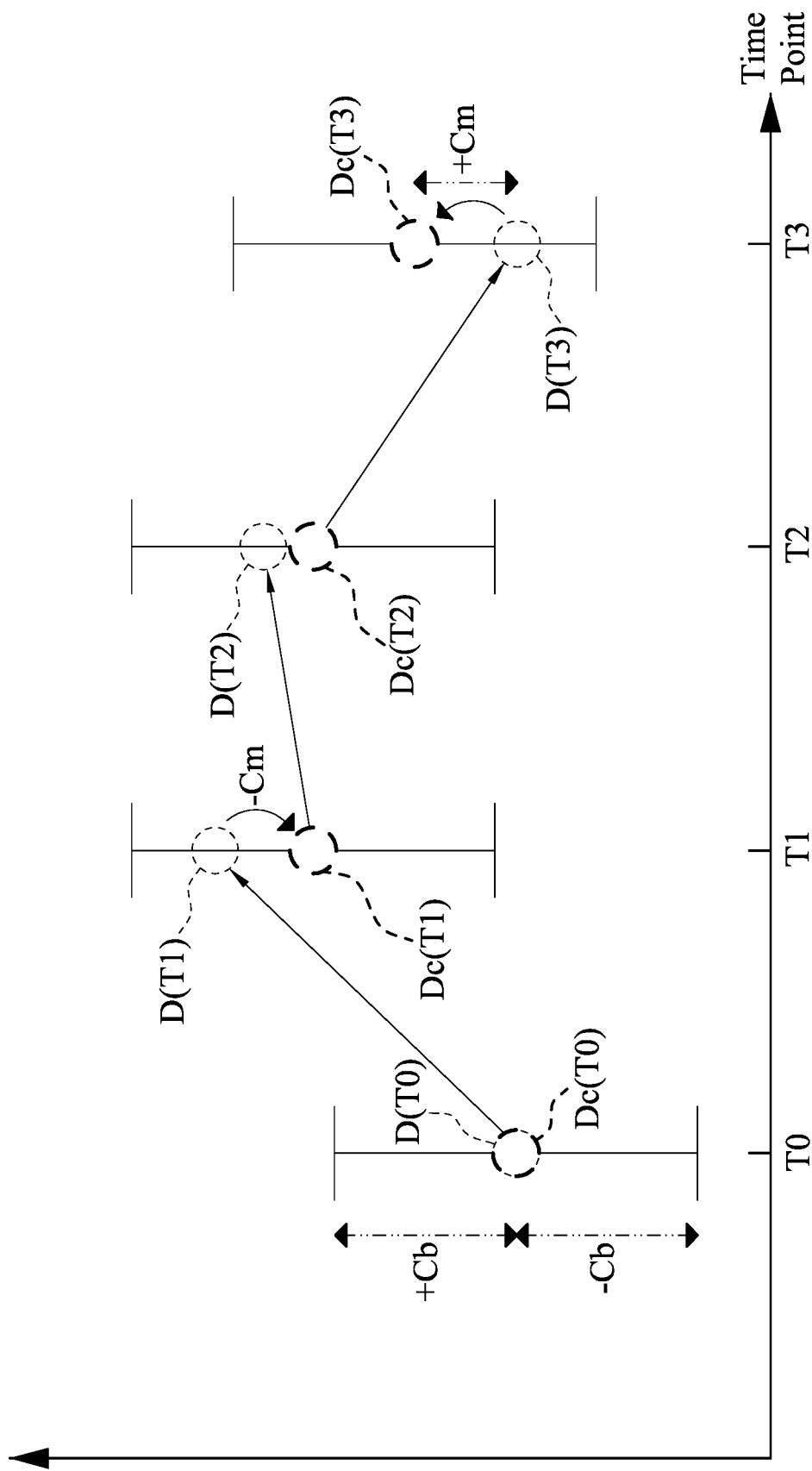
FIG. 7 is a schematic diagram of a center value and a correction coefficient setting in the method of stabilizing the data of the digital signals according to the third embodiment of the present disclosure.
Figures 8, 9:
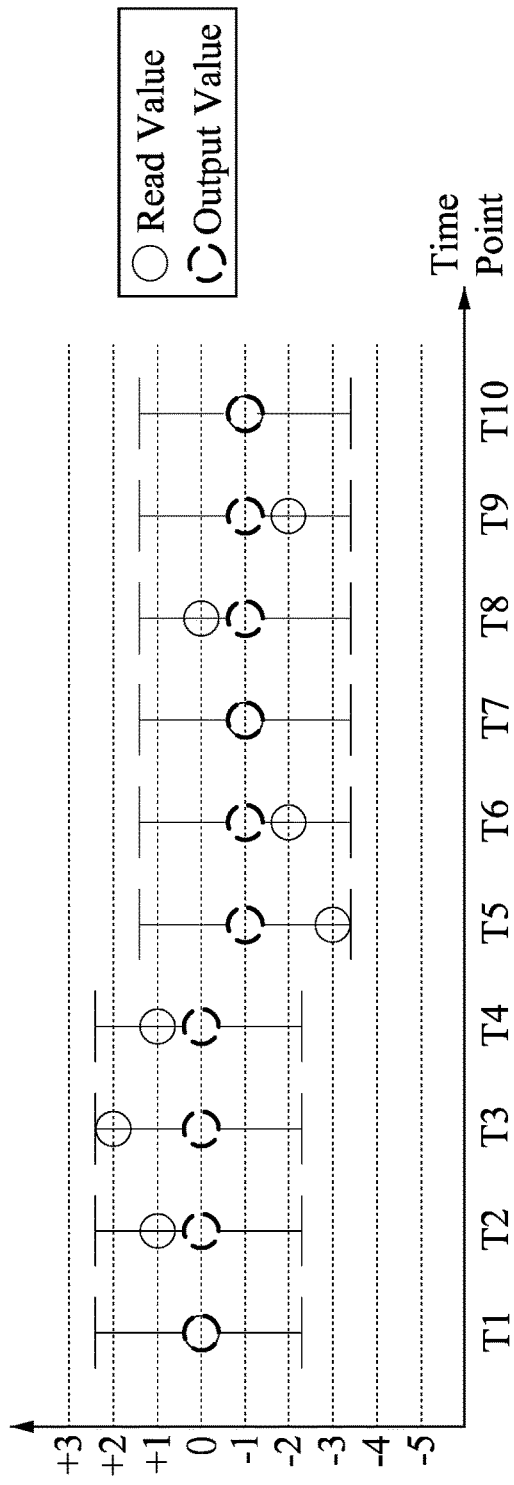
FIG. 8 is a schematic diagram of the boundary coefficient being set to "2" and the correction coefficient being set to "2" in the method of stabilizing the data of the digital signals according to the third embodiment of the present disclosure.
FIG. 9 is a schematic diagram of the center value being generated when both a boundary coefficient and the correction coefficient are set to "2" in the method of stabilizing the data of the digital signals according to the third embodiment of the present disclosure.

Reference is made to FIGS. 3, 7 to 9, in which FIG. 3 is a flowchart diagram of a method of stabilizing data of digital signals according to a third embodiment of the present disclosure, FIG. 7 is a schematic diagram of a center value and a correction coefficient setting in the method of stabilizing the data of the digital signals according to the third embodiment of the present disclosure, FIG. 8 is a schematic diagram of the boundary coefficient being set to "2" and the correction coefficient being set to "2" in the method of stabilizing the data of the digital signals according to the third embodiment of the present disclosure, and FIG. 9 is a schematic diagram of the center value being generated when both a boundary coefficient and the correction coefficient are set to "2" in the method of stabilizing the data of the digital signals according to the third embodiment of the present disclosure.

The method of stabilizing the data of the digital signals may include steps S301 to S307 shown in FIG. 3. The steps S301 to S307 are applicable to an example of FIGS. 7 to 9, but the present disclosure is not limited thereto.

In the embodiment, not only the positive boundary coefficient and the negative boundary coefficient are set in the above steps S201 to S203, but also the correction coefficient is set in step S301. As shown in FIG. 7, the positive boundary coefficient is represented by +Cb, the negative boundary coefficient is represented by −Cb, and the correction coefficient is represented by Cm. For example, in the example of FIGS. 8 and 9, the correction coefficient is set to "2", the positive boundary coefficient is set to "+2", and the negative boundary coefficient is set to "−2". It should be understood that, the correction coefficient may be set to "0", which is equivalent to none of the correction coefficients in the first and second embodiments.

After step S301 is performed, steps S205 to S213 are sequentially performed as described above. Then, step S215 is performed. In step S215, it is determined whether or not the difference (that may be the positive difference or the negative difference) between the output value of the previous piece of digital data and the value of the next piece of digital data currently read is larger than the positive boundary coefficient. If it is determined that the difference is larger than the positive boundary coefficient in step S215, step S303 is then performed. In step S303, the correction coefficient is subtracted from the value of the next piece of digital data to obtain a first center value. Then, step S307 is performed. In step S307, the center value is updated and the updated center value is equal to the first center value. Then, step S221 is performed. In step S221, the value that is equal to the updated center value is outputted as the output value.

Conversely, if it is determined that the difference is not larger than the positive boundary coefficient in step S215, step S217 is then performed. In step S217, it is determined whether or not the difference is smaller than the negative boundary coefficient. If it is determined that the difference is smaller than the negative boundary coefficient, step S305 is then performed. In step S305, the value of the next piece of digital data and the correction coefficient are added up to obtain a second center value. Then, step S307 is performed. In step S307, the center value is updated and the updated center value is equal to the second center value. Then, step S221 is performed. In step S221, the value that is equal to the updated center value is outputted as the output value.

Conversely, if it is determined that the difference is not larger than the positive boundary coefficient and not smaller than the negative boundary coefficient, the center value does not need to be updated. Therefore, in step S221, the value that is equal to the center value that is not updated is outputted as the output value.

For example, as shown in FIGS. 8 and 9, a value "−3" of the digital data is read at a time point T5. A previous output value "0" is subtracted from the value "−3" of the digital data to obtain a difference "−3". The difference "−3" is smaller than the negative boundary coefficient "−2". Therefore, steps S305 and S307 are then sequentially performed. In step 305, the value "−3" of the digital data that is read at the time point T5 and the correction coefficient are added up to obtain a value "+2". In step S307, the center value is updated and the updated center value is equal to the value "−1".

Figure 4:
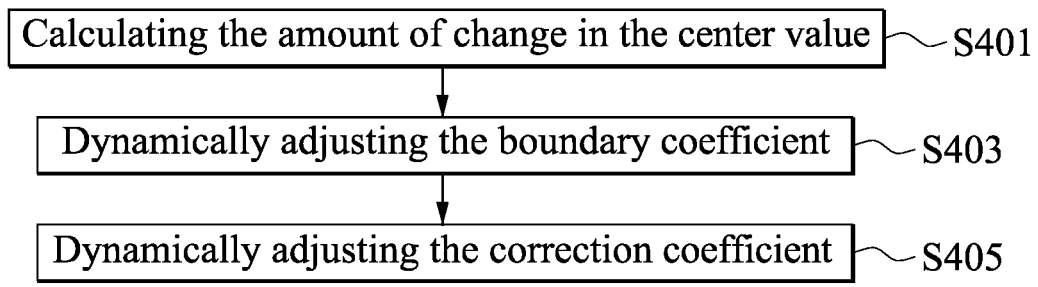
FIG. 4 is a flowchart diagram of a method of stabilizing data of digital signals according to a fourth embodiment of the present disclosure.

Reference is made to FIG. 4, which is a flowchart diagram of a method of stabilizing data of digital signals according to a fourth embodiment of the present disclosure.

The method of stabilizing the data of the digital signals may further include steps S401 to S405 shown in FIG. 4. The steps S401 to S405 may be performed after step S119 or S221 is performed. It should be understood that, some of the steps S401 to S405 may be omitted according to actual requirements.

In step S401, an amount of change in the center value is calculated.

In step S403, the boundary coefficient (including the positive boundary coefficient, the negative boundary coefficient, or a combination thereof) is dynamically adjusted according to the amount of change in the center value.

In step S405, the correction coefficient is dynamically adjusted according to the amount of change in the center value.

If necessary, the method may further include the following step: determining whether or not a number of pieces of digital data that are read reaches a data threshold. If the number of pieces of digital data that are read does not reach the data threshold, the next piece of digital data is then read. If the number of pieces of digital data that are read reaches the data threshold, steps S401 to S405 are then sequentially performed.

In addition, if necessary, the method may further include the following step: determining whether or not the amount of change in the center value is larger than an amplitude threshold or falls within an amplitude threshold range. If the amount of change in the center value is not larger than the amplitude threshold or does not fall within the amplitude threshold range, the boundary coefficient and the correction coefficient are not changed. If the amount of change in the center value is larger than the amplitude threshold or falls within the amplitude threshold range, one or both of steps S403 and S405 may be performed.

Figure 10:
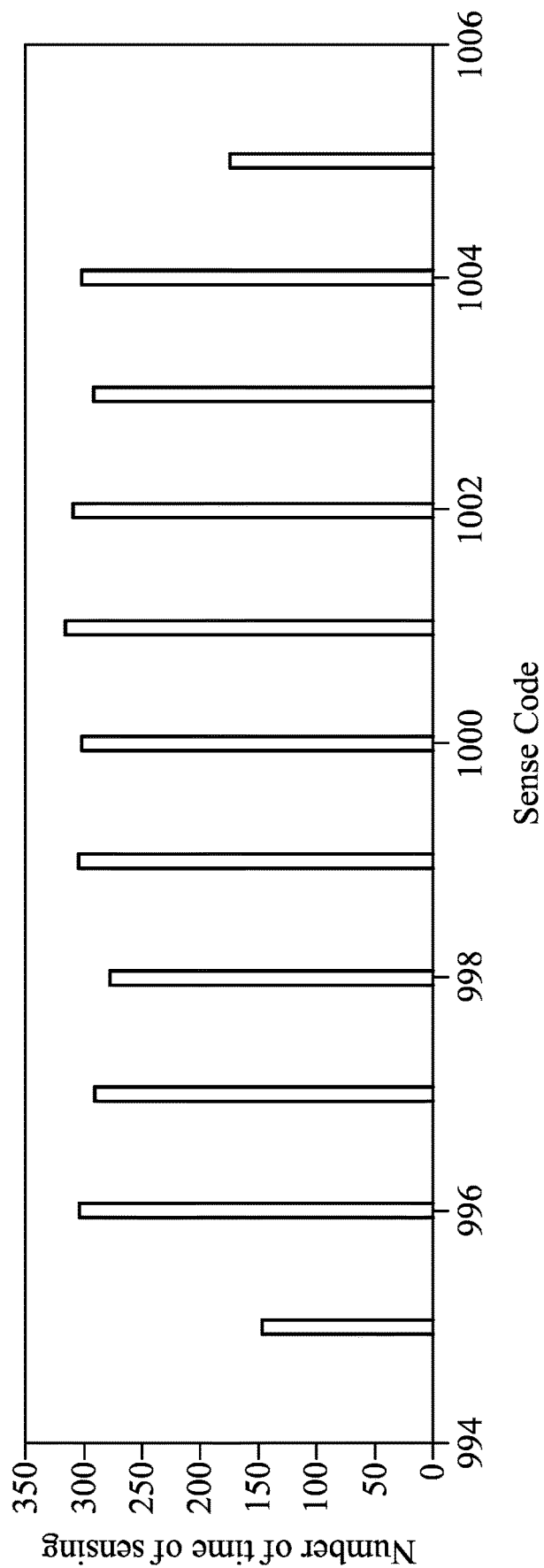
FIG. 10 is a histogram diagram of values outputted by a sensor to which the method of stabilizing the data of the digital signals of the embodiments of the present disclosure is not applied.
Figure 11:
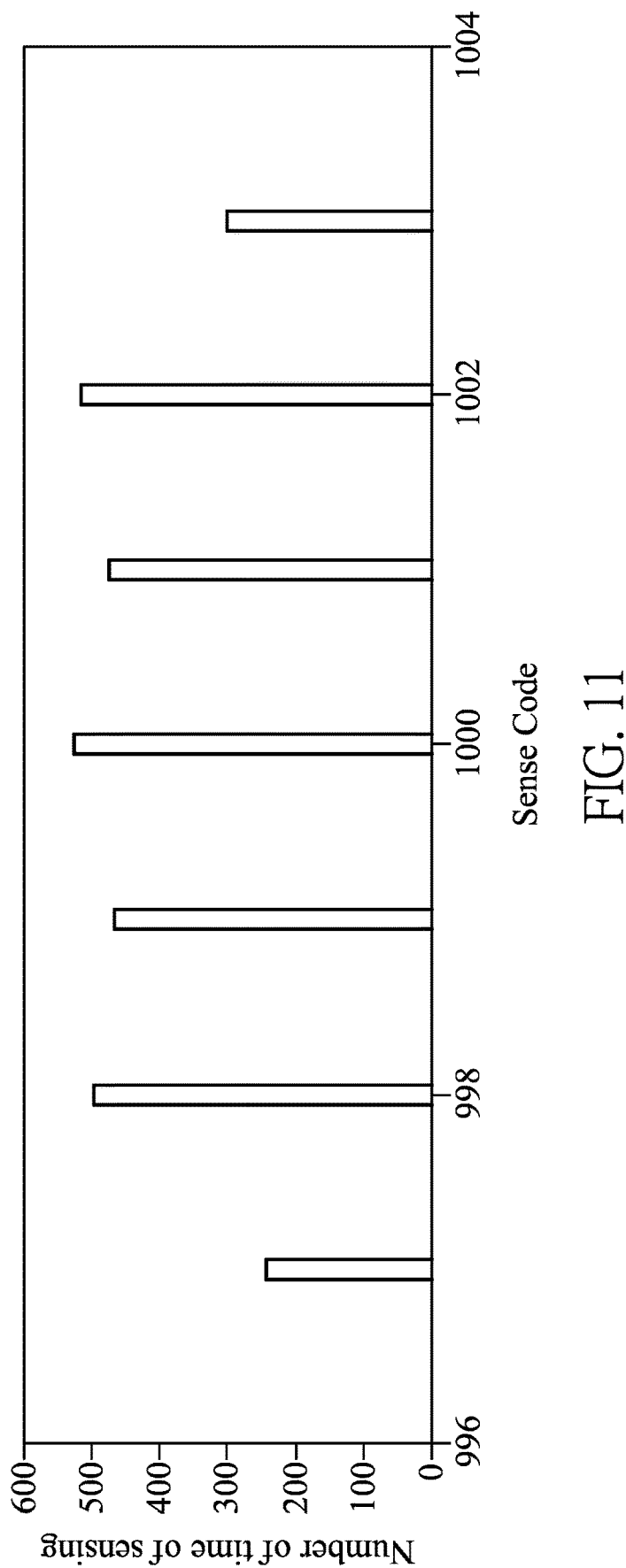
FIG. 11 is a histogram diagram of values outputted by the sensor to which the method of stabilizing the data of the digital signals of the embodiments of the present disclosure is applied.

Reference is made to FIGS. 10 and 11, in which FIG. 10 is a histogram diagram of values outputted by a sensor to which the method of stabilizing the data of the digital signals of the embodiments of the present disclosure is not applied, and FIG. 11 is a histogram diagram of values outputted by the sensor to which the method of stabilizing the data of the digital signals of the embodiments of the present disclosure is applied.

As shown in FIGS. 10 and 11, it is assumed that the center value is 1000, the changed value of the digital data falls within a range of the center value +/−5, the boundary coefficient is set to "2", and the correction coefficient is set to "2".

When the method of stabilizing the data of the digital signals is not applied to the sensor, the user reads different sense codes on the sensor respectively at different time points. The different sense codes respectively represent different light intensities. For example, eleven kinds of values are read by the user and respectively represented by eleven bars in the histogram diagram of FIG. 10.

In contrast, when the method of stabilizing the data of the digital signals of the embodiment of the present disclosure is applied to the sensor, only seven kinds of values on the sensor are read by the user and respectively represented by seven bars in the histogram diagram of FIG. 11.

It is apparent that, when the method of stabilizing digital signal data of the embodiment is applied to the sensor, the fluctuation in the value read by the user is effectively reduced.

Figure 12:
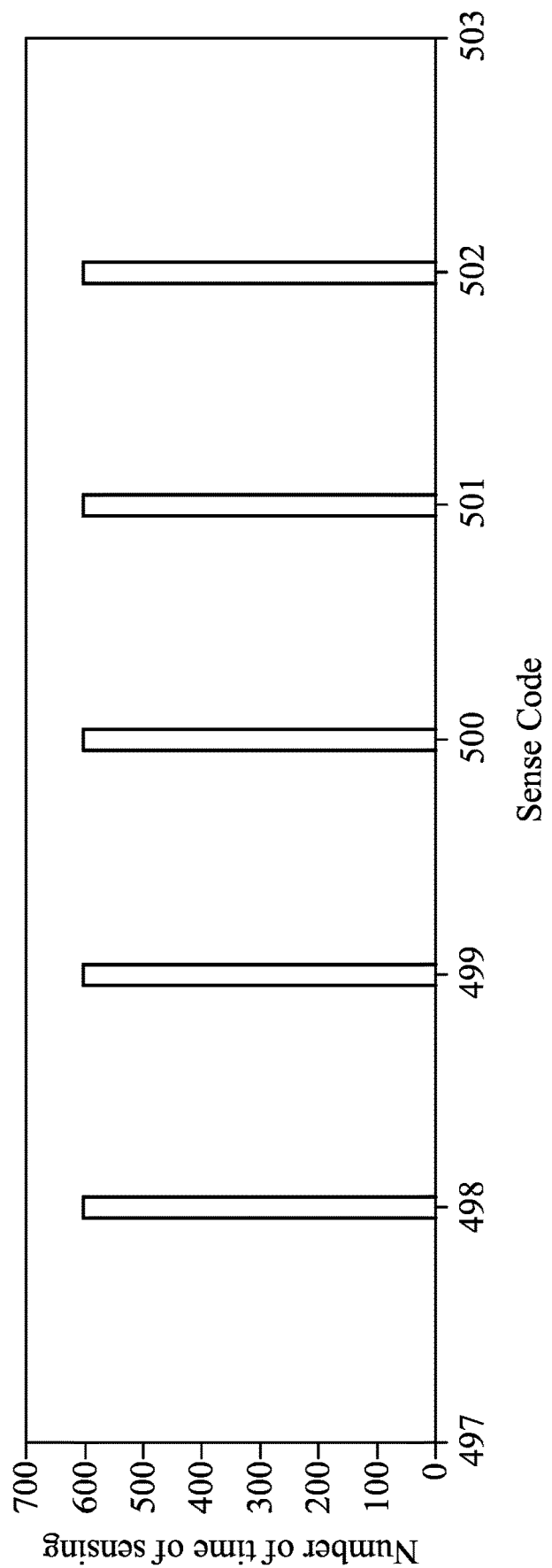
FIG. 12 is a histogram diagram of values outputted by the sensor to which the method of stabilizing the data of the digital signals of the embodiments of the present disclosure is not applied.
Figure 13:
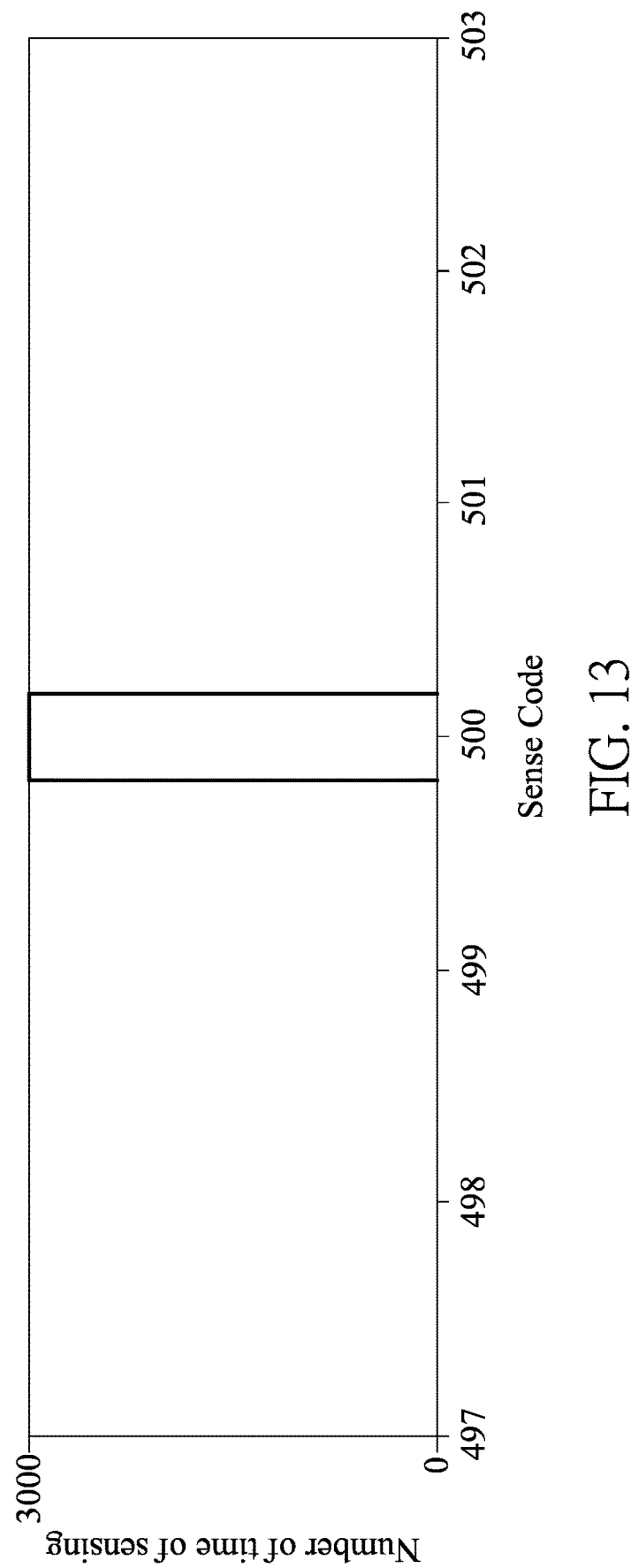
FIG. 13 is a histogram diagram of values outputted by the sensor to which the method of stabilizing the data of the digital signals of the embodiments of the present disclosure is applied.

Reference is made to FIGS. 12 and 13, in which FIG. 12 is a histogram diagram of values outputted by the sensor to which the method of stabilizing the data of the digital signals of the embodiments of the present disclosure is not applied, and FIG. 13 is a histogram diagram of values outputted by the sensor to which the method of stabilizing the data of the digital signals of the embodiments of the present disclosure is applied.

As shown in FIGS. 12 and 13, it is assumed that the center value is 500, the changed value of the digital data falls within a range of the center value +/−2, the boundary coefficient is set to "2", and the correction coefficient is set to "2".

When the method of stabilizing the data of the digital signals is not applied to the sensor, the user reads different sense codes on the sensor respectively at different time points. The different sense codes respectively represent different light intensities. For example, five kinds of values are read by the user and respectively represented by five bars in the histogram diagram of FIG. 12.

In contrast, when the method of stabilizing the data of the digital signals of the embodiment is applied to the sensor, only one kind of value on the sensor is read by the user and represented by one bar in the histogram diagram of FIG. 13.

Figure 14:
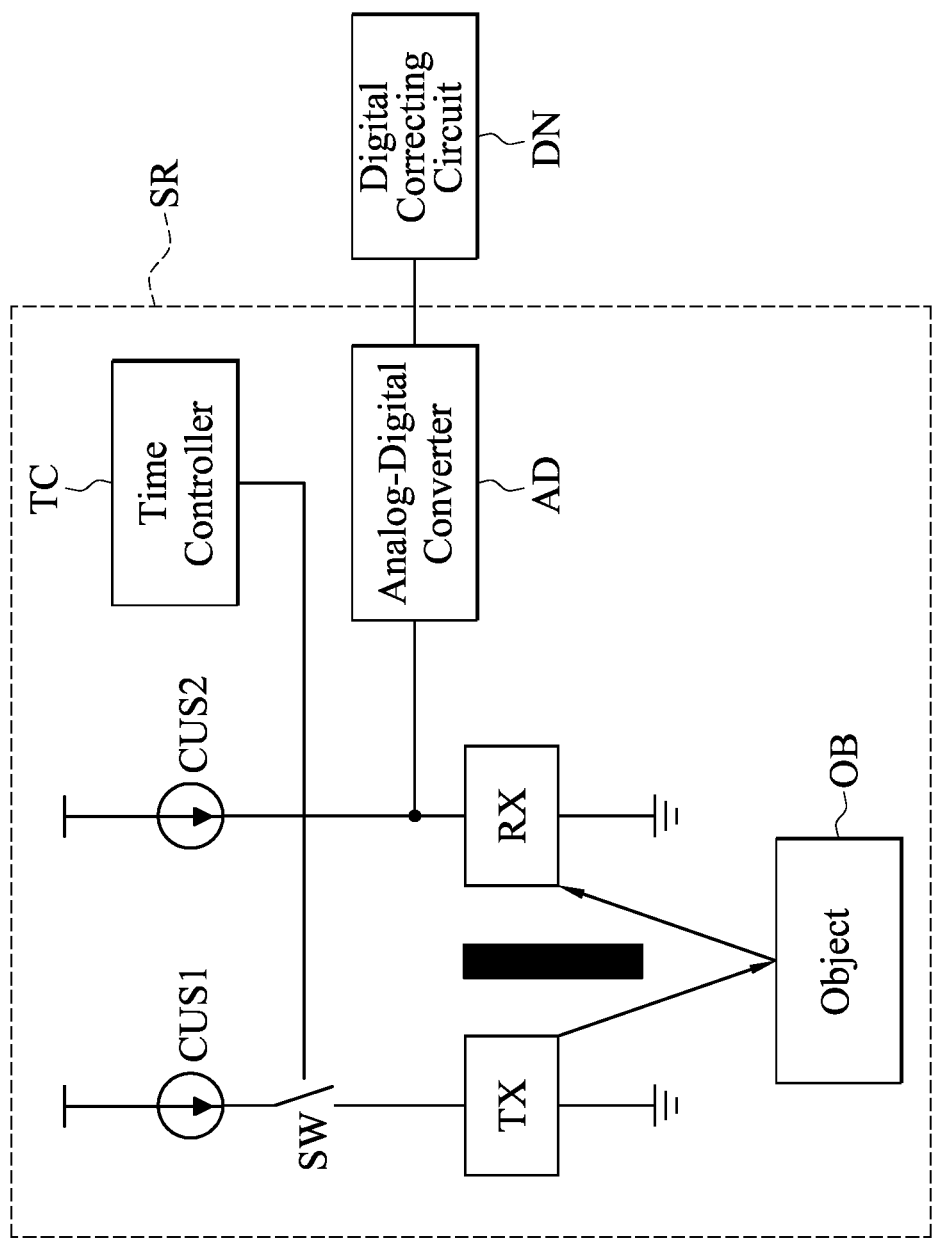
FIG. 14 is a block diagram of a system of stabilizing data of digital signals and a proximity sensor according to a fifth embodiment of the present disclosure.
Figure 15:
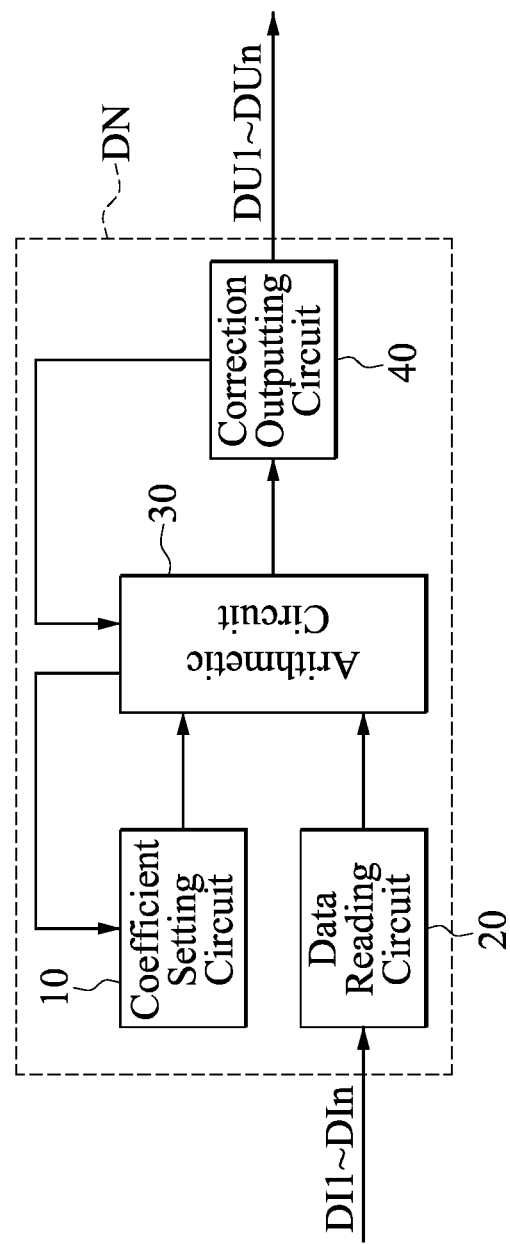
FIG. 15 is a block diagram of a system of stabilizing data of digital signals according to a sixth embodiment of the present disclosure.

Reference is made to FIGS. 14 and 15, in which FIG. 14 is a block diagram of a system of stabilizing data of digital signals and a proximity sensor according to a fifth embodiment of the present disclosure, and FIG. 15 is a block diagram of a system of stabilizing data of digital signals according to a sixth embodiment of the present disclosure.

A digital correcting circuit DN shown in FIGS. 14 and 15 may be applied to a sensor SR shown in FIG. 14. The sensor SR may be a proximity sensor or may be called a distance sensor, but the present disclosure is not limited thereto. In practice, the sensor SR may be replaced with an ambient light sensor or other sensors.

A transmitter TX emits a light signal toward an object OB. Then, the light signal is reflected to a light receiver RX by the object OB. An analog-digital converter AD may convert the reflected light signal that is an analog signal into a digital signal.

As shown in FIG. 15, the system of stabilizing the data of the digital signals may read multiple pieces of digital data DI1 to DIn of digital signals from the sensor SR. The method of stabilizing the data of the digital signals that is described in the first to fourth embodiments may be performed on the digital signals to output digital data DU1 to DUn that is not corrected or has been corrected. The digital data DU1 to DUn represents a current ambient light intensity and displayed on a display component of the sensor or an electrical device of the user.

For example, in the embodiment, the digital correcting circuit DN of the system of the embodiment may include a coefficient setting circuit 10, a data reading circuit 20, an arithmetic circuit 30 and a correction outputting circuit 40. The arithmetic circuit 30 is connected to the coefficient setting circuit 10, the data reading circuit 20 and the correction outputting circuit 40.

The data reading circuit 20 may be configured to read the values outputted by the sensor SR or other sensors as described in steps S103, S109, S205, S211. The coefficient setting circuit 10 may be configured to set and adjust one or more of the boundary coefficients, the positive boundary coefficient, the negative boundary coefficient and the correction coefficient according to the amount of change in the center value as described in steps S101, S201, S203, S301, S403, S405.

The arithmetic circuit 30 may be configured to define and update the center value, execute the addition/subtraction operations, correct the read digital data DI1 to DIn, and calculate the amount of change in the center value as described in steps S105, S111, S113, S207, S213, S219, S303 to S307, S401.

The correction outputting circuit 40 may be configured to compare the value calculated by the arithmetic circuit 30 with the boundary coefficient, the positive boundary coefficient or the negative boundary coefficient, (instruct the arithmetic circuit 30 to update the center value and execute the above-mentioned addition/subtraction operations,) and outputs the digital data DU1 to DUn that is not corrected or has been corrected, as described in steps S115, S119, S209, S215, S217, S221.

In summary, the present disclosure provides the method of stabilizing data of digital signals, which has the following advantages:
1. the boundary coefficient and the correction coefficient are set such that a signal-to-noise ratio (SNR) of the sensor reaches a target signal-to-noise ratio, thereby improving stability of the outputted signal;
2. the method is applicable to an environment in which the ambient light intensity and noise are low and capable of minimizing the fluctuation in the outputted signal;
3. when the difference between the value of the piece of digital data and the value of the next piece of digital data is larger than the boundary coefficient, the appropriate operations are immediately executed without requiring additional calculation time;
4. each of the pieces of digital data is only compared with the previous piece of digital data, and these digital data do not occupy too much space in a register;
5. a digital filter, an averaging circuit or other digital signal processors can be used; and
6. the method can be performed by the hardware and the software.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method of stabilizing data of digital signals, comprising the following processes:
   (a) setting a positive boundary coefficient;
   (b) setting a negative boundary coefficient;
   (c) setting a correction coefficient;
   (d) reading a piece of digital data;
   (e) defining a value of the piece of digital data as a center value;
   (f) outputting the value of the piece of digital data;
   (g) reading a next piece of digital data;
   (h) subtracting the value of the piece of digital data from a value of the next piece of digital data to obtain a difference, wherein the difference is a positive value or a negative value;
   (i) determining whether or not the difference is larger than the positive boundary coefficient, in response to determining that the difference is larger than the positive boundary coefficient, subtracting the correction coefficient from the value of the next piece of digital data to obtain a first center value, updating the center value such that the center value is equal to the first center value, then performing step (k), and in response to determining that the difference is not larger than the positive boundary coefficient, performing step (j);
   (j) determining whether or not the difference is smaller than the negative boundary coefficient, in response to determining that the difference is smaller than the negative boundary coefficient, adding up the value of the next piece of digital data and the correction coefficient to obtain a second center value, updating the center value such that the center value is equal to the second center value and then performing step (k), and in response to determining that the difference is not smaller than the negative boundary coefficient, performing step (k); and
   (k) outputting the value that is equal to the center value.

2. The method of stabilizing the data of the digital signals according to claim 1, further comprising the following process:
   (l) setting an absolute value of the positive boundary coefficient that is equal to an absolute value of the negative boundary coefficient.

3. The method of stabilizing the data of the digital signals according to claim 1, further comprising the following processes:
   (m) calculating an amount of change in the center value; and
   (n) dynamically adjusting the positive boundary coefficient and the negative boundary coefficient according to the amount of change in the center value.

4. The method of stabilizing the data of the digital signals according to claim 1, further comprising the following processes:
- (v) calculating an amount of change in the center value; and
- (w) dynamically adjusting one or more of the correction coefficient, the positive boundary coefficient and the negative boundary coefficient according to the amount of change in the center value.

* * * * *